United States Patent [19]

Babel

[11] Patent Number: 4,473,867
[45] Date of Patent: Sep. 25, 1984

[54] MULTI-PURPOSE LAMP

[75] Inventor: Michael Babel, Hari Yerushalim, Israel

[73] Assignee: Or-Tzurim, Israel

[21] Appl. No.: 362,545

[22] Filed: Mar. 26, 1982

[51] Int. Cl.³ .............................................. B60Q 1/00
[52] U.S. Cl. ..................................... 362/80; 362/267; 362/307; 362/310; 362/311; 362/363; 362/368; 362/370; 362/375
[58] Field of Search ................. 362/80, 267, 307, 310, 362/311, 363, 368, 370, 375

[56] References Cited

U.S. PATENT DOCUMENTS 3,692,999  9/1972  Napierski et al. .................. 362/196

Primary Examiner—Stephen J. Lechert, Jr.
Attorney, Agent, or Firm—Steele, Gould & Fried

[57] ABSTRACT

A multi-purpose lamp especially for use on vehicles. The lamp comprises a housing formed of a pair of dismountable interengaged, matching plastic shell members. A portion of one of the shell members is translucent and a bulb-socket member is retained between the shell members.

9 Claims, 8 Drawing Figures

4,473,867

MULTI-PURPOSE LAMP

BACKGROUND OF THE INVENTION

The present invention provides a multi-purpose electrical lamp, especially suitable for use on vehicles and characterized by a simple construction, ease of assembly and installation and versatility. The invention also provides a kit of components for constructing such multi-purpose lamps.

The lamp according to the invention is particularly adapted for use on land motor vehicles, where such lamps may serve as e.g. signalling lights, warning lights, emergency lights, backing up lights, etc. As is well known, there exist in current use for such purposes a host of various lamps differing in shape, size, construction, color and light intensity and distribution. As compared to all these conventional lamps, the present invention has the object of providing a novel lamp of simple construction and comparatively low cost, which is also easy to assembly and dismantle and which can be easily adapted to one or the other of the aforelisted purposes by simple replacement of components and/or addition of simple accessories.

SUMMARY OF THE INVENTION

The above object is attained in accordance with the present invention in that it provides a multi-purpose lamp, especially for use on vehicles, comprising a housing formed of a pair of dismountably interengaged, matching plastic shell members, at least a portion of one of said shell members being translucent or transparent, and a bulb-socket member retained between said shell members.

In a further aspect the invention provides a set of components for the construction of a multi-purpose lamp as defined above, said set comprising two matching plastic shell members, at least one of which is at least partially translucent, said shell members being adapted to form upon their mutual engagement a substantially closed housing, and a bulb-socket member adapted to be retained between said two shell members in their assembled state.

The two shell members which together form the outer part of the housing of the lamp according to the invention, may be identical to, or different from each other, and are preferably made each of a single integral moulding of plastics material. The shell members may have any desired shape and may thus assume the form of open prismatic, cylindrical, frustoconical and the like shells. The two shell members may, preferably, have identical cross-sections at their open ends. At least a portion of one of the pair of shell members forming any single lamp, is translucent or transparent. Preferably this shell member may be made entirely of a translucent or transparent plastic material of suitable color. Where the lamp according to the invention is intended for use as a bidirectional light source, both shell members forming the housing will be made, at least partially, of translucent or transparent material.

One or both of the inner and outer surfaces of the translucent portion of a shell member for use in the lamp according to the invention, may be formed with a suitable pattern of corrugations, grooves, indentations and the like, in accordance with the particular specifications for the desired light distribution of the lamp.

The two shell member constituents of the lamp are dismountably interengaged by means of any conventional mechanical means, e.g. clamps, brackets or, preferably, screws, which latter may at the same time serve to secure the lamp to a support (as a rule, the body of a vehicle). To this end each of the shell members may preferably be provided with a plurality of bores adapted to receive connecting screws. Mating alignment means may be provided on the two shell members for ease of assembly.

In accordance with a preferred embodiment, a resilient gasket of suitable shape is interposed between the two shell members, one or both of which may be provided, in such a case, at/or adjacent the rim or rims with a peripheral groove adapted to retain the resilient gasket.

The socket member for use in the lamp according to the invention is also preferably made of electrically insulating plastic material and comprises a socket in the form of an open or blind bore adapted to receive and retain therein the base portion of a standard electrical light bulb. The socket member also comprises suitably oriented electrical contacts and connectors for connecting the terminals of the bulb to an external electrical current supply, via suitable leads. Where the socket member is entirely confined within the housing of the lamp, these electrical leads may pass through one or more bores provided in the walls of the housing, which bore or bores may be located in the sidewall of one of the shell members constituting the housing. In accordance with a preferred embodiment, a centrally located bore for the passage of the electrical leads, is formed at the junction of the two shell members upon their inter-engagement, by the juxtaposition of a pair of preferably semi-circular recesses provided at the rims of the shell members. In this embodiment of the invention, there is preferably also provided a resilient grommet adapted to be sealingly received and retained in said bore, so as to permit the passage of the electrical leads.

In an alternative preferred embodiment, flat feed-through elements passing between the two shell members are provided. The resilient gasket may then comprise a suitably located split portion through which the feedthrough elements pass.

In the lamp according to the invention, the socket member is releasably retained between the two shell members in their interengaged state in such a manner that upon dismantling of the lamp by separating the two shell members, the socket member is automatically released from therebetween. In order to retain the socket member in such a manner and for the purpose of its correct positioning within the lamp housing, there are provided, in accordance with the present invention, engagement means on one or both of the shell members, and/or on the socket member. In accordance with one embodiment of the invention, as illustrated in FIGS. 1 to 5 of the attached drawings, an annular socket member is provided with a pair of longitudinal, diametrically opposite grooves adapted to cooperate each with a correspondingly located fin-like projection provided at the center of the closed base portion of each of the shell members. Alternatively, as in the embodiment illustrated in FIGS. 6 to 8 of the attached drawings, the annular socket member is provided with a pair of radial projections adapted to cooperate with matching recesses in boss-like projections provided in the base portion of each shell member. It should be clear, however, that the invention is not limited to such a structure, but is meant to include all possible variations thereof. Thus, for example, a lamp according to the invention might comprise an annular socket member provided with an annular peripheral groove adapted to be retained in a centrally located bore formed by a pair of semi-circular recesses provided each at the rim of one of the shell members (as described above in connection with an optional bore for the passage of the electrical leads).

The lamp according to the invention may also comprise, as an optional component for specific uses of the lamp, a curved reflector made of thin metal sheet or of metallized plastics. Such reflectors are of the type conventionally used in motor-vehicle lamps. These may be especially adapted for use in the lamps according to the present invention, by providing the reflector edges with a peripheral outwardly directed continuous flange or with peripheral tabs, by means of which the reflector is retained between the edges of the two shell member halves of the lamp housing. For this purpose, one or both of the shell members may be provided at the rim with a peripheral groove adapted to receive and retain a bentover peripheral flange of a reflector. Alternatively, where such a peripheral groove is already provided at the rim of one or both shell members for receiving a gasket (as described above) this same groove might also serve for receiving the peripheral flange of a reflector.

An alternative arrangement for aligning and securing a reflector may comprise a plurality of fin-like projections symetrically disposed on the back-surface of the reflector, adjacent the periphery thereof, adapted to engage corresponding slots provided at the side walls of at least one shell member.

BRIEF DESCRIPTION OF THE DRAWINGS

The invention will now be described in further detail having reference to the attached non-limiting drawings in which.

DETAILED DESCRIPTION OF THE PREFERRED EMBODIMENTS

Figure 1:
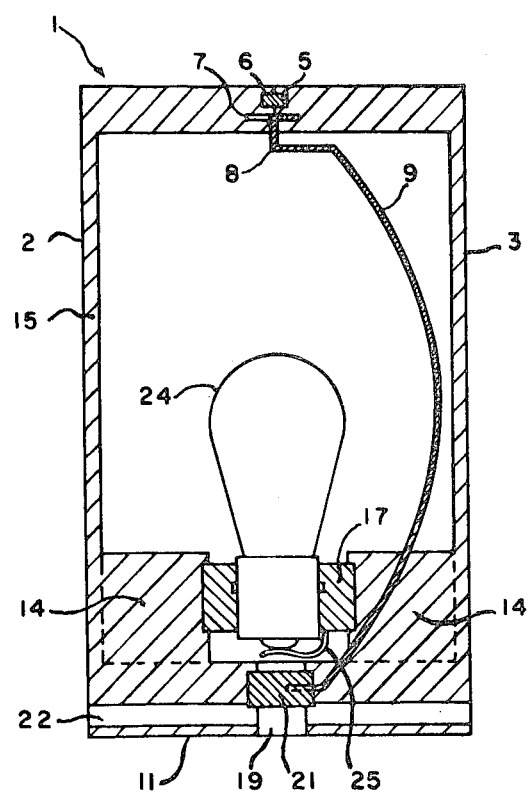
FIG. 1 is a cross-sectional view of a lamp according to an embodiment of the invention.

As seen in the drawings, a lamp 1 (in FIG. 1) comprises a housing formed by a pair of identical shell members 2, 3 each made of a translucent plastics material moulded in the form of an open, flat square box. The two shell members 2, 3 are dismountably secured to each other by means of the four screws (not shown) passing through bores 4 (FIG. 2) provided adjacent the four corners of the shell members 2, 3. A resilient gasket 5 is interposed between the shell members 2, 3 and received in a peripheral groove 6 provided in the rim of each shell member. A second, narrower groove 7 is provided at the edges of the top and bottom side walls of each shell member 2, 3, inwardly of said groove 6, for retaining therein an outwardly directed, doubly-bent flange 8 of a reflector 9.

Figure 2:
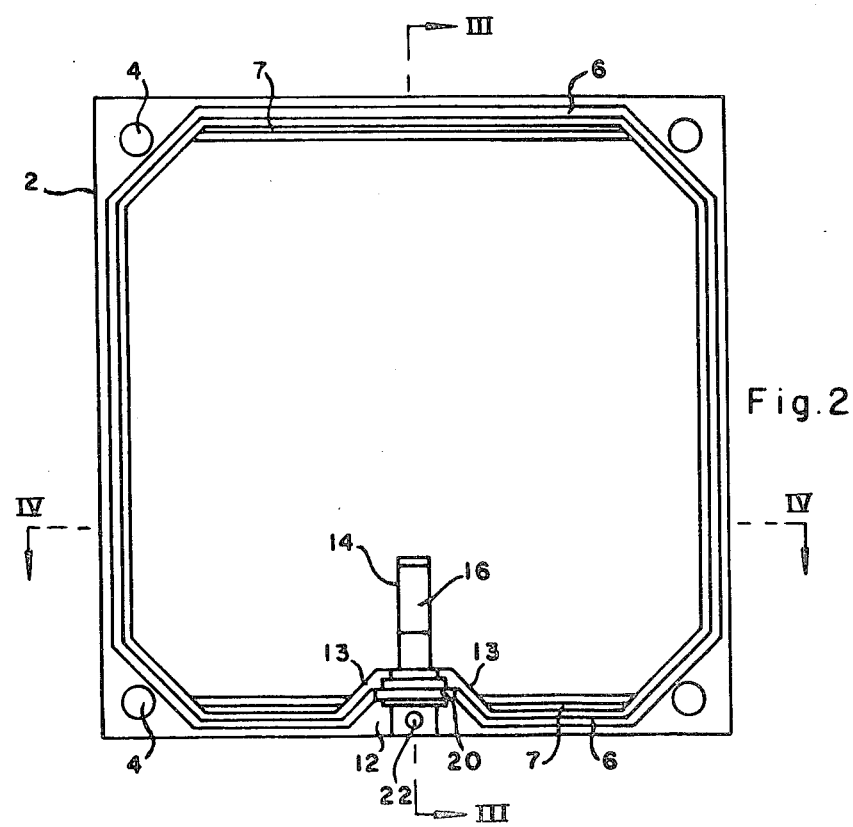
FIG. 2 is a plan view of one of the shell members forming the housing of the lamp of FIG. 1, viewed from its open side.
Figure 3:
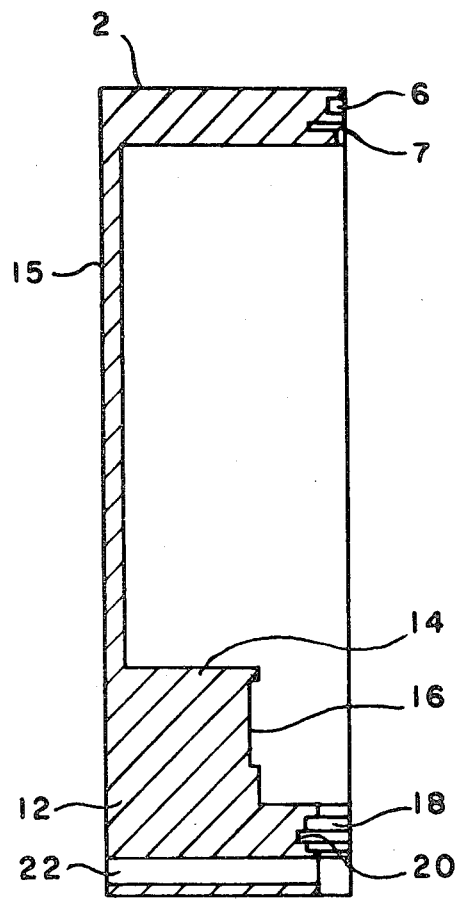
FIG. 3 is a cross-sectional view of the shell member of FIG. 2, taken along the line III—III in FIG. 2.
Figure 4:
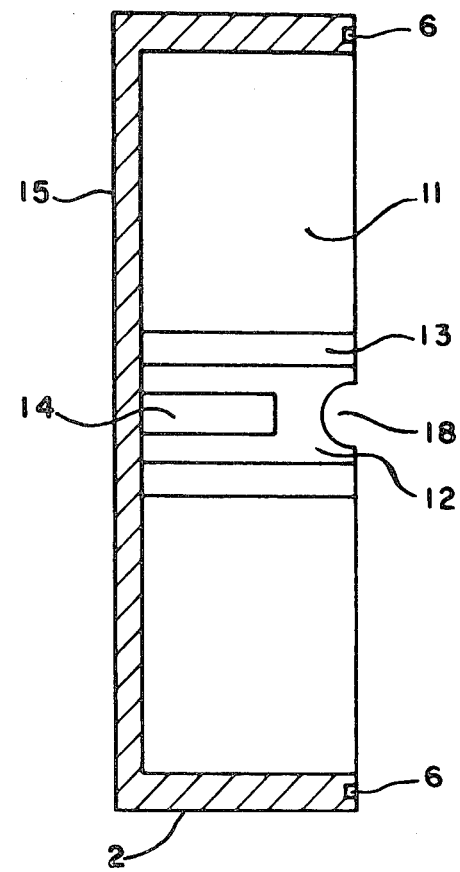
FIG. 4 is another cross-sectional view of the shell member of FIG. 2 taken along the line IV—IV in FIG. 2.

The bottom side wall 11 of each shell member 2, 3 is provided with a centrally located, rectangular reinforced portion 12 of greater thickness than the remaining portions of the side walls, said reinforced portion 12 merging on each side with the adjacent, thinner portions of the bottom wall 11, via sloping shoulders 13. A fin-like partition 14 projects upwardly from the reinforced portion 12 and inwardly from the adjacent wall 15 (which wall 15 constitutes the "bottom" or "base" portion of the open box-like shell member 2). These fin-like partitions 14 serve to engage and retain the socket member 17, (described below) and are provided for this purpose, at their vertical edges, with suitable recesses 16 (FIGS. 2 and 3).

A semi-circular recess 18 is provided at the center of the edge of the lower sidewall 11 of each shell member 2, 3, such that in the assembled state of the lamp (as shown in FIG. 1) the two recesses 18 form together a circular bore 19. An internal groove 20 is provided in the inner wall of the recess 18 for the purpose of retaining a grommet 21 (FIG. 1) made of a resilient material. In the embodiment shown in the attached drawings, there is also provided in the bottom sidewall 11 of each shell member 2, 3 a centrally located longitudinal bore 22, which may serve for the passage therethrough of the electrical leads, when this becomes more convenient, or even required, owing to a particular manner of installation of the lamp on a support, such as a body of a vehicle.

The lamp 1 illustrated in the drawings further comprises an annular socket member 17 made of electrically insulating plastics material and comprising a circular central bore 23 adapted to receive the base portion of a standard light bulb 24 of the bayonet-seat type. The socket member 17 is provided with internal electrical contacts and connectors (not shown) and with an external metallic spring-type contact 25 (in FIG. 1), which contacts and connectors may be connected to an external current source by means of lead wires (not shown). As explained above, such lead wires may pass either through bore 19 or through both bores 19 and 22.

Figure 5:
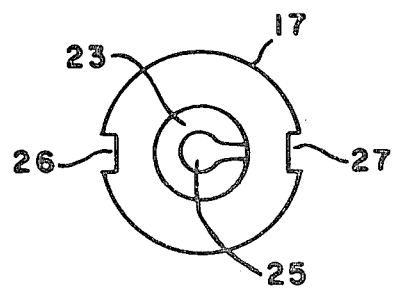
FIG. 5 is a top plan view of the socket members of the embodiment shown in FIG. 1 (without the bulb)

As shown in FIG. 5, the socket member 17 is provided at its outer wall with a pair of diametrically opposite, longitudinal grooves 26, 27 adapted to engage with and be retained by the recesses 16 at the edges of the fin-like partitions 14 on each shell members 2,3, in the assembled state of the lamp.

In a further aspect the invention also provides a set of components for assembly of a lamp according to the invention, which set comprises two matching shell mambers and a socket member. Thus, for constructing a lamp in accordance with the embodiment of the invention illustrated in the attached drawings, a set of components would include the two shell members 2,3 and the socket member 17, as essential components. Such a set may further comprise, as optional components and accessories, one or more light bulbs, a reflector (such as 9 in FIG. 1) a gasket (such as 5 in FIG. 1), a grommet (such as 21 in FIG. 1) and connecting screws (to fit into the bores 4 in FIG. 2).

Figure 6:
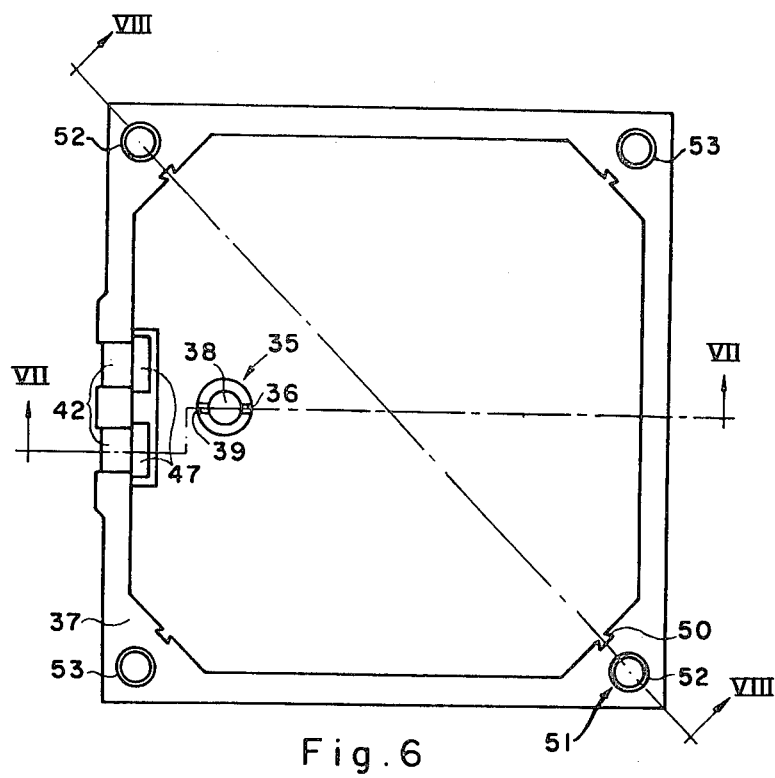
FIG. 6 is a plan view of one of the shell members forming the housing of an alternative embodiment of the lamp, viewed from its open side.
Figure 7:
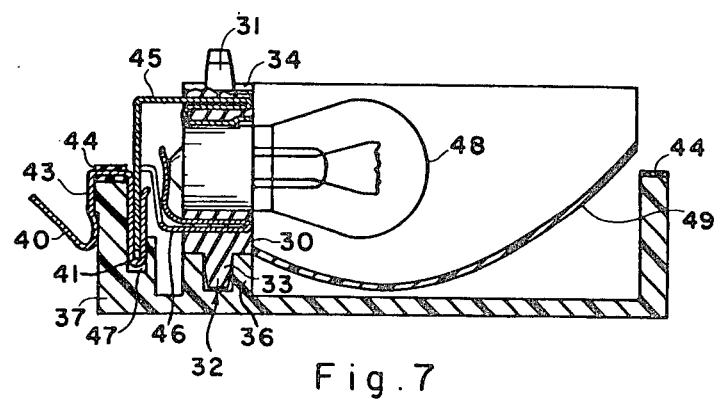
FIG. 7 is a partially sectioned view, along the lines VII—VII in FIG. 6, of a partially assembled alternative embodiment of the lamp of the present invention.
Figure 8:
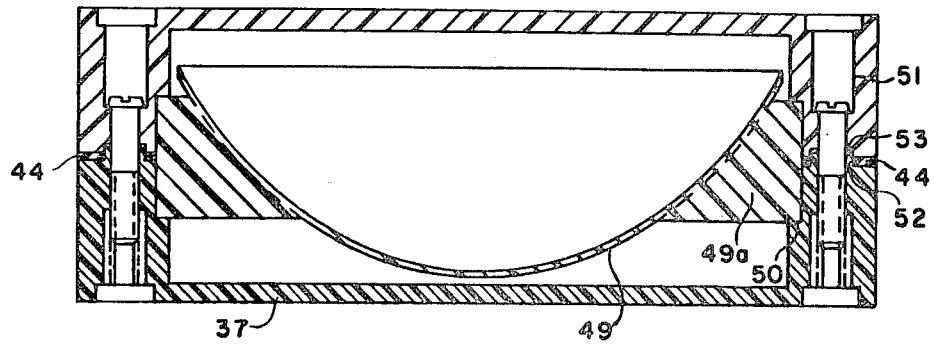
FIG. 8 is a cross sectional view, along the lines VIII—VIII in FIG. 6, of an assembled alternative embodiment of the lamp of the present invention.

Another embodiment of the invention is illustrated in FIGS. 6 to 8 of the drawings. This embodiment is generally similar to the one shown in FIGS. 1 to 5 and, therefore, only its differing features will be discussed in detail hereinbelow.

One of these differing features distinguishing between the two aforesaid embodiments, is the manner in which the bulb-socket member is counted. As can be seen in FIG. 7, the annular socket member 30 is formed with a pair of diametrically opposite, radial projections 31, 32, each comprising a cylindrical pin 33 and an axially extending flange 34. In the assembled state of the lamp, the projections 31, 32 of the bulb-socket member 30 fit into matching recesses 35 provided in bosses 36 projecting inwardly from the base portion of each shell member 37. Each recess 35 is comprised of a central cylindrical bore 38 and a groove 39, adapted to receive the pins 33 and the flange 34, respectively, thereby to align the socket member 30 and prevent it from both rotation and translation.

The embodiment of FIGS. 6 to 8 also differs from that of FIGS. 1 to 5 in the structure and location of the electrical leads, all of which consist of flat strips of conductive metal. As shown in FIG. 7, a pair of such feedthrough members 40, enter the lamp housing via grooves 42, (in FIG. 6) and via a slit formed in the gasket 44. Feedthrough members 40 are formed each as an S-shaped double spring clip, one resiliently bent portion 43 of which clips extend along an outside wall of one of the shell members 37, whereas a second bent portion 41 is located inside the lamp housing and serves to engage the end of a contact element 45 (or 46) to be described below.

As shown in FIG. 7 the last mentioned spring clip portions 41 are accommodated in suitable recesses 47 provided in the shell member 37 adjacent its side wall. The external ends of the feedthrough members 40 are formed as standard male electrical contacts for automotive connectors.

As also seen in FIG. 7, the bulb-socket member 30 is provided with two electrical contact elements 45 and 46 fitted into suitable axial bores in the socket member 30. One end of each contact elements 45, 46 serves to establish electrical contact with the bulb 48 whilst the other end is adapted to fit into the spring clip portions 41 of the feedthrough members 40, as mentioned, to be retained thereby in electrical contact therewith.

The bulb-socket member is formed with an additional bore (not shown) to facilitate the provision of a third contact element for a two-filament bulb.

The lamp according to the embodiment shown in FIGS. 6 to 8 also comprises a reflector 49 which is releasably retained by means of four fin-like projections 49a having rail-shaped edges, formed on the back-surface thereof and adapted to be engaged by suitably shaped slots 50 provided at the four corners of the shell member 37.

A further feature of the embodiment of FIGS. 6 to 8 is means for simultaneously aligning the two shell members 37 and positioning and holding the gasket 44. These means are located at the four screw-bores 51 provided at the corners of each shell member 37, and consist of two sleeve-like projections 52 at a pair of opposite corners of the shell member and two matching counter-bores 53 at the two other corners. The sleeve-like projections 52 engage the gasket 44 through holes provided at each corner of the gasket.

It will be evident to those skilled in the art that the invention is not limited to the details of the foregoing illustrative embodiments, and that the present invention may be embodied in other specific forms without departing from the essential attributes thereof, and it is therefore desired that the present embodiments be considered in all respects as illustrative and not restrictive, reference being made to the appended claims, rather than to the foregoing description, and all changes which come with the meaning and range of equivalency of the claims are therefore intended to be embraced therein.

I claim:

1. A multi-purpose lamp for use in connection with a vehicle, the lamp comprising:
    a housing formed by a pair of dismountably interengaged, matching plastic shell members of substantially identical structure, at least a portion of one of said shell members being translucent;
    a bulb-socket member retained between said shell members by interengaging recesses and projections disposed on said bulb-socket member and said shell members;
    each of said shell members having at least one groove formed along the peripheral edge thereof extending from inside to outside of said shell member;
    electrical conductive elements seated in said grooves for connecting said bulb-socket member inside said housing to an electrical power source outside said housing; and,
    means for mounting said housing on a vehicle.

2. The lamp according to claim 1, wherein at least one of said shell members consists of an integral molding of a translucent plastics material.

3. The lamp according to claim 1, wherein, said bulb-socket member is entirely confined within said housing when said lamp is assembled.

4. The lamp according to claim 1, wherein said bulb-socket member is formed with bores and recesses for accommodating electrical contact-making elements.

5. The lamp according to claim 1 wherein at least one of said shell members is formed with at least one slot for engagement with matching engaging means of a reflector.

6. The lamp according to claim 5, further comprising a reflector releasably retained inside the housing by means of said slot.

7. A set of components for the assembly of a lamp according to claim 1, which set comprises:
    two matching plastic shell members of substantially identical structure, at least one of which is at least partially translucent;
    a bulb-socket member retainable between said two shell members in their assembled state, said shell members forming a substantially closed housing for said bulb-socket member upon their mutual engagement; and,
    electical conductive elements electrically connected to the bulb-socket member for powering a lamp and extending from inside to outside said housing for connection to an electrical power source.

8. The lamp according to claim 1, wherein at least one of said shell members consists of an integral molding of a transparent plastics material.

9. In combination with a vehicle, a multi-purpose lamp, comprising:
    a housing formed of a pair of dismountably interengaged, matching plastic shell member of substantially identical structure, at least a portion of one of said shell members being translucent;

a bulb-socket member retained between said shell members by interengaging recesses and projections disposed on said bulb-socket member and said shell members;

each of said shell members having at least one groove formed along the peripheral edge thereof for seating electrical conductive elements;

electrical conductive elements seated in said grooves and extending from inside to outside of said shell members; and, means for mounting said housing on a vehicle.

* * * * *